May 3, 1966   J. A. KOZEL   3,249,120
FLUID-OPERATED MIXING VALVE
Filed May 22, 1962   2 Sheets-Sheet 2
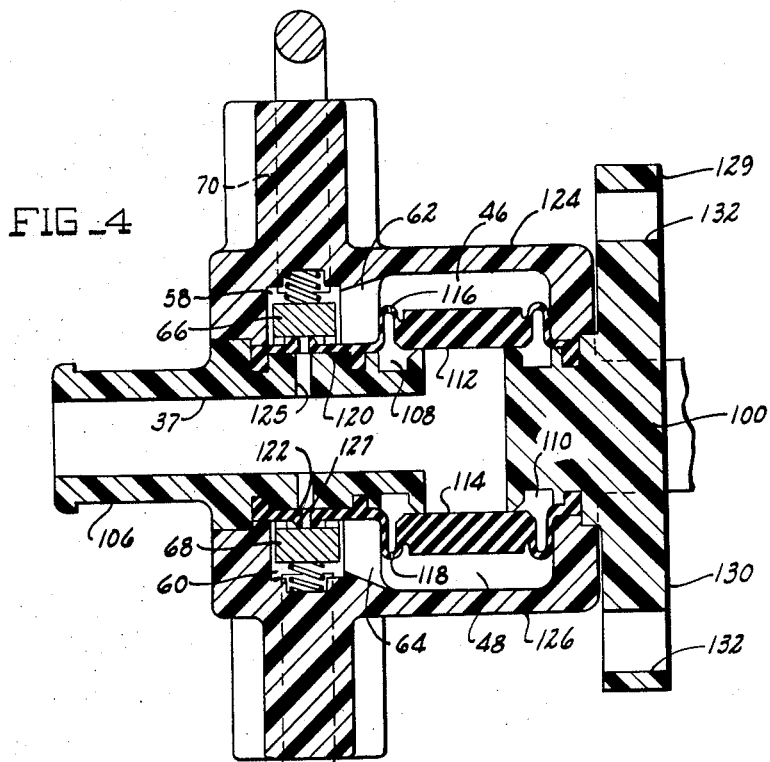
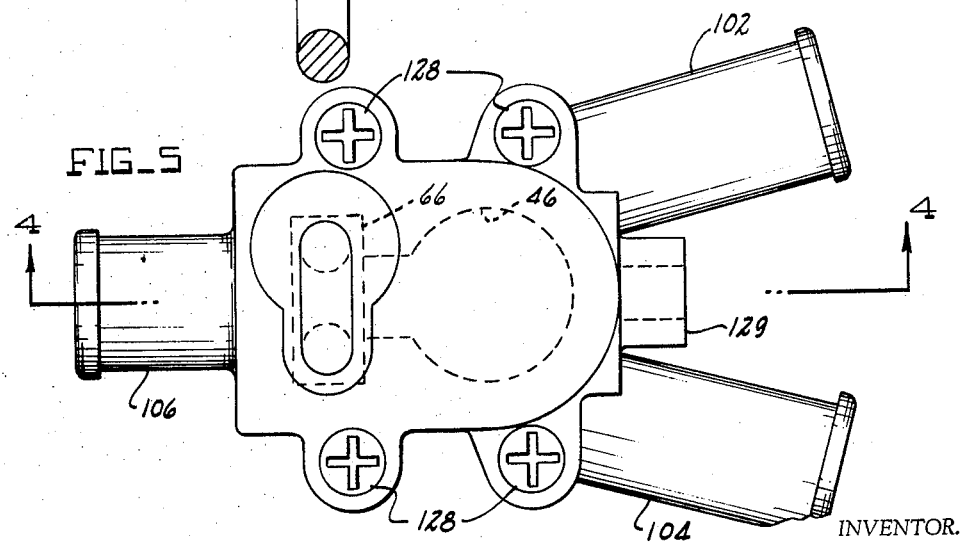
INVENTOR.
JAMES A. KOZEL
BY Andrew K. Joulds
his ATTORNEY

United States Patent Office 3,249,120
Patented May 3, 1966

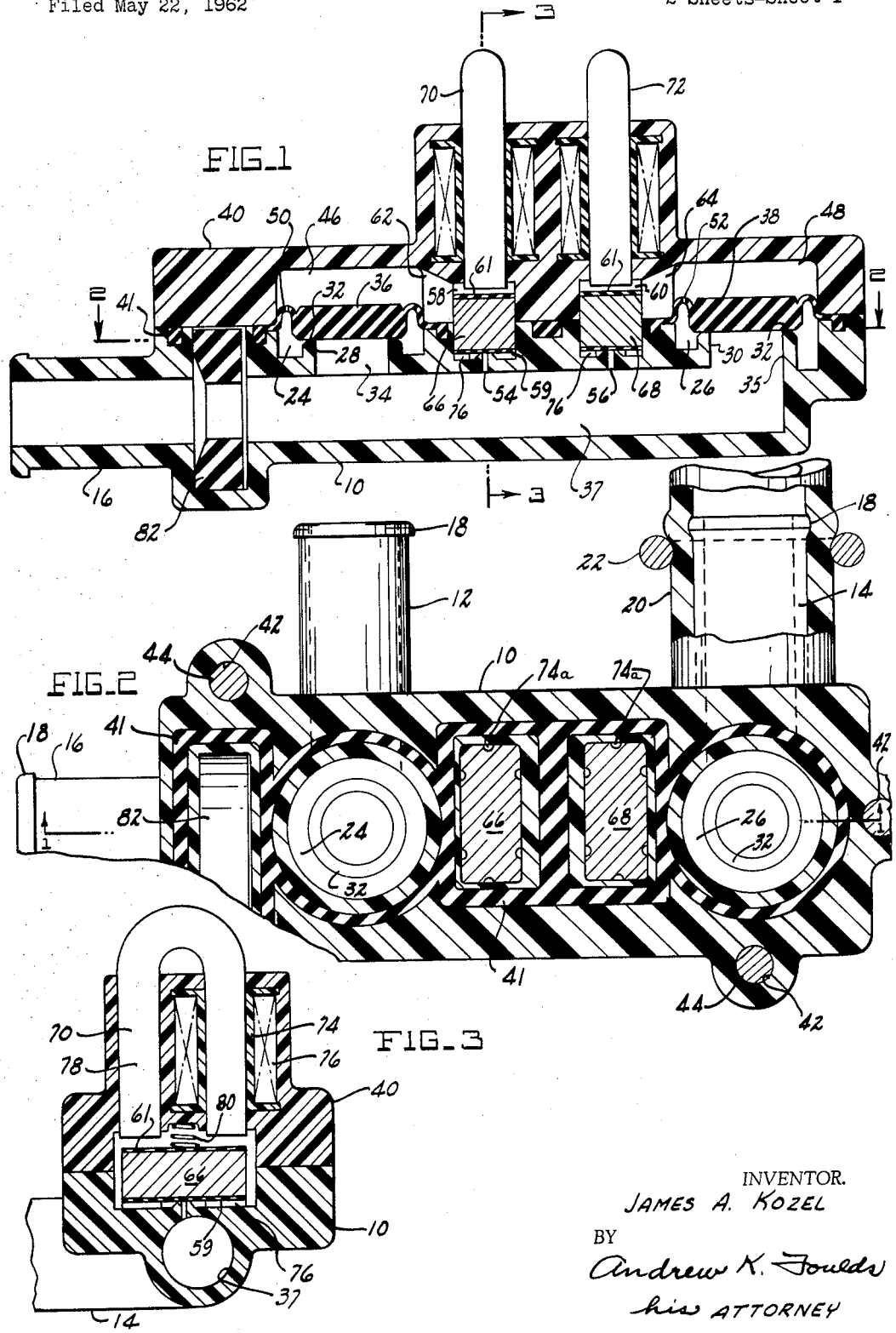

3,249,120
FLUID-OPERATED MIXING VALVE
James A. Kozel, Franklin, Mich., assignor to American Radiator & Standard Sanitary Corporation, New York, N.Y., a corporation of Delaware
Filed May 22, 1962, Ser. No. 196,796
9 Claims. (Cl. 137—606)

This invention relates to fluid-operated valves such as are employed in the washing machine industry to supply hot and cold water to the washing chamber of the machine.

Conventionally hot and cold water has been supplied to the washing chambers of washing machines by means of water-operated solenoid-controlled mixing valves which have a hot water inlet, a cold water inlet, and a mixed water outlet. Each inlet is provided with a diaphragm type valve element which has a centrally located pilot port extending therethrough in registry with the plunger-type armature of a solenoid coil positioned on one face of the valve body. In operation, when the solenoid coil is energized its plunger-type armature is drawn away from the pilot port in the diaphragm for causing the water to be exhausted from the pressure chamber into the outlet chamber to enable the diaphragm to be forced open by the inlet water pressure. By selectively and concurrently energizing the solenoids, as by means of a timer, it is possible to introduce into the washing chamber desired quantities of water having desired temperature characteristics.

The above-identified type of mixing valve has over the years been improved to reduce its cost and service life. However it still requires relatively large solenoids, and it suffers to a certain extent because of noise due to solenoid hum and vibratory action of the armature.

It is a general object of the present invention to improve the above-mentioned valve construction by further reducing its cost and noise characteristic.

More particularly it is an object of the present invention to reduce costs by rearranging parts so that a smaller solenoid is required to operate the armature.

In connection with the above object, it is a further object to rearrange the pilot hole into a fixed location remote from the diaphragm, so that the pilot-closing armature can have a relatively small distance movement such that it will not have to travel a long way to move out of the path of the diaphragm, as under previous practice. The small distance movement of the armature enables a relatively small solenoid coil to be used.

It is a further object to provide a pilot orifice-armature arrangement wherein the armature and pilot orifice have cooperating flat surfaces such that slight armature misalignment has no effect on the sealing action. This enables the pilot orifice to be formed as a relatively small diameter opening, which in turn permits a further reduction in the solenoid power requirements necessary to operate the armature. Thus the solenoid size can be further reduced by this construction.

It is a further object to provide an arrangement in which the solenoid is a relatively small size, and the armature is faced with rubber on at least one of its surfaces so that the valve operates with less solenoid hum and armature noise.

It is an additional object of the invention to reduce costs by forming the solenoid and its core as an insert in a molded cover element, thereby eliminating certain frame elements, cap elements, and bracket elements which have heretofore been necessary.

It is a general object of the invention to provide for cost reduction by reducing the number of parts and simplifying the parts handling procedures required to form the complete valve.

Other objects of this invention will appear from the following description and appended claims, reference being had to the accompanying drawings forming a part of this specification wherein like reference characters designate corresponding parts in the several views.

In the drawings:
FIGURE 1 is a sectional view through one embodiment of the invention taken substantially on line 1—1 in FIG. 2;
FIG. 2 is a sectional view taken on line 2—2 in FIG. 1;
FIG. 3 is a sectional view taken on line 3—3 in FIG. 1;
FIG. 4 is a sectional view taken on line 4—4 in FIG. 5; and
FIG. 5 is a top plan view of a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURES 1 through 3

There is shown one embodiment of the invention comprising a valve body 10 formed of nylon or other strong plastic material. The valve body includes two integrally formed tubular conduits 12 and 14, and an integrally formed tubular outlet conduit 16. The inlet conduits are smooth surfaced and are provided with flanges 18 so that a rubber hose 20 can be telescoped thereover and clamped thereon by means of a conventional wire-type clamping ring 22.

As best shown in FIG. 1, valve body 10 has an upper face which is suitably configured to define an annular inlet chamber 24 communicating with the conduit 12 and an annular inlet chamber 26 communicating with the inlet conduit 14. Each inlet chamber is defined in part by an annular wall 28 or 30 which forms an annular valve seat 32 and an outlet chamber 34 or 35, the arrangement being such that when the rubber diaphragm 36 or 38 is raised from seat 32 fluid is enabled to flow from the respective inlet chamber past the valve seat to the respective outlet chamber. Each outlet chamber connects with a discharge passage 37 which is axially aligned with the outlet conduit 16. A conventional volume regulating flow annulus 82 may be disposed in the discharge passage or at some other location in the valve body if desired.

In the illustrated construction diaphragms 36 and 38 are formed as integral parts of a single rubber molding designated generally by numeral 41. This rubber molding is configured with annular gasket areas for sealing the joints around certain mating recesses formed in the upper face of valve body 10 and the lower face of a molded cover element 40. The rubber component is retained in place on valve body 10 by means of cover element 40 which has suitable openings registering with the tapped holes 42 formed in valve body 10. Conventional screws 44 are extended through the cover holes into the tapped openings to retain the cover element in place on the valve body. This is a departure from previous practice in that previously the cover element has generally been formed as a metal cap element and has been retained in place by means of a separate frame or bracket member.

Cover element 40 is provided with two spaced recesses 46 and 48 which cooperate with diaphragms 36 and 38 to define pressure chambers for operating the diaphragms. Each diaphragm is provided with a small bleed opening 50 or 52 so that liquid in the respective inlet chamber 24 or 26 is enabled to flow through the small opening into the chamber at 46 or 48 and thus normally hold the respective diaphragm in its closed position.

Each diaphragm is opened by exhausting fluid from the respective pressure chamber, as through grooved passages 62 or 64, offset cover element pocket recesses 58 or 60, and bleed passages 54 or 56. Attached within the bleed chamber formed by each recess 58 or 60 is an armature disc 66 or 68, the lower face of which is provided with a rubber lamination 59 so that each armature disc constitutes a pilot valve element for controlling flow through the bleed passage 54 or 56. The upper face of each armature disc may if desired also be provided with a rubber lamination 61 as further assurance of reducing noise when the armature is attracted to the U-shaped core element 70 or 72 which forms part of a solenoid. Each recess 58 or 60 has a major axis which is contained within the plane of the corresponding core 70 or 72.

As best shown in FIG. 3, each solenoid comprises a spool 74 having a predetermined number of copper wire turns wound thereon as designated at 76. The core 70 for the coil is of round cross section rod stock, and is formed into a generally U-shaped configuration as shown in FIG. 3. In assembly operations the spool 74-coil 76 assembly is frictionally fitted onto one leg of core 70, and cover element 40 is formed therearound as a plastic molding, preferably of epoxy resin. The core 70 is of one-piece construction so that air gaps are eliminated, thereby forming a solenoid of relatively high magnetic efficiency. The drawings show both legs of the U-shaped core as embedded in molded cover element 40. However, it is not necessary for the left leg of the core to be embedded insofar as magnetic characteristics are concerned. This leg of the core is preferably embedded in the molding to reinforce the molding and generally improve the cover element insofar as mechanical strength is concerned. It is contemplated that within the broader aspects of the invention the major part of the left leg of the core could be located outside of the cover element molding. The action on armature disc 66 or 68 is the same with either construction.

Each armature disc is preferably provided with grooves or recesses 74a on its side surfaces and grooves or recesses 76 on its lower surfaces to permit fluid from passage 62 or 64 to reach the respective bleed passage 54 or 56. Grooves 76 are cut into the lower surfaces of the disc to form legs which cause the disc to seat correctly on the bottom surface of the confining chamber such that the rubber lamination 59 on the armature correctly engages the pilot valve seat formed at the upper end of the respective bleed passage. In this manner the rubber lamination has a good sealing action against the flat valve seat, and the armature has no tendency to become misaligned with respect to the seat. This is in contrast to the conventional arrangement wherein the armature comprises a vertical plunger having a pointed lower end registering with a bleed orifice formed in a central portion of the main valve diaphragm. In such conventional arrangements the pointed end of the plunger must accurately align with the bleed orifice; otherwise when the solenoid is de-energized the plunger will not be ensured of fitting correctly into the orifice so as to seal against flow. The necessity for accurate alignment in the prior art devices has required the orifice to have a relatively large diameter, as for example .050 inch. The present arrangement permits the passage to have a relatively small diameter, as for example .030 inch. The small diameter orifice can be opened with a relatively small coercive force from the solenoid coil. As a result the coil can be made smaller and with less turns than the solenoid coils used in the prior art constructions. A further reduction in coil size can be achieved because the armature 66 or 68 operates against a fixed orifice and is required to travel only a very small distance. This is in contrast to the aforementioned conventional arrangement wherein the plunger-type armature must travel a relatively great distance in order to permit the diaphragm to have a full stroke. The float type mounting of the armature disc and its rectilinear type movement are also considered advantageous features.

The general mode of operation of the FIG. 1 valve involves energization and de-energization of the solenoids. When one of the solenoids is de-energized a light compression spring 80 ensures movement of disc 66 or 68 to a position closing bleed passage 54 or 56, whereupon inlet fluid flowing through opening 50 or 52 is trapped in the pressure chamber above the corresponding diaphragm so as to force the diaphragm closed against annular seat 32. On energization of a solenoid coil 76 the corresponding armature disc is drawn away from the corresponding bleed passage so that fluid is exhausted from above the corresponding diaphragm, whereupon the fluid pressure in the annular inlet chamber 24 or 26 forces the diaphragm open. The solenoids may be operated sequentially or concurrently as is conventional in this type valve.

FIGURES 4 and 5

This construction is operationally similar to the FIG. 1 construction. It differs therefrom in the fact that the valve body is provided with two cover elements located on its opposite faces. Each of the cover elements mounts one coil-core assembly, and each core-coil assembly controls flow of a hot or cold fluid stream.

More particularly there is shown a molded plastic valve body 100 having integrally formed tubular inlet conduit 102 and 104, and an integrally formed tubular outlet conduit 106. Tubular conduit 102 communicates with an annular inlet chamber 108, and tubular conduit 104 communicates with an annular inlet chamber 110. The opposite faces of the valve body are closed by diaphragms 112 and 114 which are each provided with a bleed opening 116 or 118. In this form of the invention each rubber diaghragm is formed integrally with a pilot valve seat extension 120 or 122, and each diaphragm-valve seat extension is secured in place by means of a molded cover element 124 or 126. Suitable screws 128 may be extended through openings in the cover elements into tapped holes in valve body 100 to secure the valve body and cover elements together.

The formation of valve seat portions 120 and 122 of rubber material is advantageous in that the valve seats can deform during the passage of fluid therethrough so that any dirt or other solid material can be exhausted through the bleed passages 125 and openings 127 without clogging same. In this connection, the rubber is enabled to breath or contract slightly under fluid pressure force so as to relieve the valve seat orifice of the dirt particles, which action is not possible with a plastic orifice such as is shown at 54 or 56 in FIG. 1.

As shown in FIG. 4, each pilot valve seat is closed by an armature disc 66 or 68 which cooperates with a U-shaped core 70 constituting part of a solenoid similar to that previously described. The solenoid is incorporated as an insert in the molded cover element 124 or 126 in the manner shown in FIG. 3.

One feature of particular interest in connection with the FIG. 4 embodiment relates to the integrally formed bosses 129 and 130 on valve body 100. These integrally formed bosses are provided with tapped holes 132 so that screws can be extended through openings in fixed wall portions of the washing machine and thence into the tapped holes to mount the valve body on the machine. This integral formation of the bosses with the valve body 100 is advantageous in that it eliminates the use of auxiliary metal brackets which have heretofore been required for valve body mounting purposes. Preferably the tapped holes are formed in the valve body rather than in the cover elements 124 or 126; this is because the valve body in most cases would be formed of nylon or other material which has a greater resistance to stripping of the hole threads than the epoxy which is utilized as the cover element material. The feature of the tapped hole mounting bosses can be provided in the FIG. 1 embodiment if desired.

Both forms of the invention are characterized by relatively small coil size and parts reduction features. The small coil size is attractive both from the low noise standpoint and the cost standpoint. The coil costs in conventional valves are approximately forty per cent of the total assembly cost, and the reduction in coil cost is quite important in reducing total cost. The feature of integrally molding the inlet conduits 12 and 14 to directly receive the rubber hoses is advantageous in reducing hose costs and to a slight extent in reducing the cost of the conduits themselves. Further cost reduction is achieved through the concept of molding the cover around the core-coil assembly so as to eliminate metal caps and auxiliary frame elements which have heretofore been used in this type of valve.

It will be understood that while the invention has been shown in two embodiments, yet it is capable of other embodiments as comprehend within the scope of the appended claims. Some features of the invention can be utilized in single solenoid valves having only a single inlet instead of the two inlets as shown.

I claim:

1. In a liquid-operated diaphragm valve having a solenoid-actuated armature valve for controlling the application of liquid to the diaphragm, a valve body for mounting the diaphragm, and a cover element for housing the diaphragm, the improvement comprising the formation of the cover element as a molded dielectric member having two separate but connected recesses in its body facing surface, the diaphragm being located in registry with one of the recesses, and the armature including a floating armature disc located in the other recess, said armature disc having two substantially parallel surfaces, one of which faces its solenoid, and the other of which constitutes a valve surface; the solenoid being encapsulated within the molded cover element.

2. In a valve having a body on one face of which is positioned a fluid-operated valve element, the improvement comprising a molded dielectric cover element having a recess in an area thereof registering with said valve body face; a one-piece U-shaped core having two legs embedded in said molded cover element with the ends thereof projecting into said recess; an electric coil comprising a spool surrounding one of said legs and wire turns wound thereon so that the coil is sealed within the cover element material; and a fluid-controlling armature disc floatably disposed in the recess to span the ends of the core whereby to move in a substantially straight line toward the core ends when the coil is energized.

3. In a valve body having an inlet chamber, an outlet chamber, and an intervening annular valve seat; and a fluid-operated main valve element positioned on the valve body and overlying the inlet and outlet chambers to control flow past the annular valve seat; the improvement comprising a molded dielectric cover element having a face thereof positioned on the valve body; said cover element face having a first recess therein cooperating with one face of the main valve element to define a pressure chamber for receiving operating fluid from the inlet chamber; said valve body having a fixed bleed passage communicating with the outlet chamber, said cover element face having a second recess registering with the fixed bleed passage so that fluid can be exhausted from the pressure chamber therethrough to thus permit the inlet chamber fluid to open the fluid-operated valve element; a pilot valve element positioned in said second recess for controlling the flow of fluid through the bleed passage; said pilot valve element and main valve element being located alongside one another and being arranged for parallel movement; and solenoid means encapsulated within the cover element to operate the pilot valve element.

4. In combination, a valve body having an annular inlet chamber, an outlet chamber concentrically disposed therewithin and cooperating therewith to define an annular valve seat; a diaphragm positioned on the valve body and overlying the inlet and outlet chambers to control flow past the annular valve seat; a molded dielectric cover element having a face thereof positioned on the valve body; said cover element face having a first recess therein cooperating with one face of the diaphragm to define a pressure chamber; said diaphragm having a bleed opening in a portion thereof communicating with the inlet chamber so that inlet fluid is enabled to flow from the inlet chamber through the bleed opening and into the pressure chamber to maintain the diaphragm closed against the annular valve seat; said cover element face having a second recess in fluid communication with the first fluid recess; said valve body having a bleed passage communicating with said second recess and interconnected with the outlet chamber so that fluid can be exhausted from the pressure chamber through the bleed passage to thus permit the inlet chamber fluid to open the diaphragm; a pilot valve element in the form of an armature floatably positioned in said second recess for controlling flow through the bleed passage; and a solenoid having its coil encapsulated within the molded cover element; the permissible travel of the armature being substantially less than the travel of the diaphragm.

5. In combination, a valve body having an annular inlet chamber, an outlet chamber concentrically disposed therewithin and cooperating therewith to define an annular valve seat; a main diaphragm positioned on the valve body and overlying the inlet and outlet chambers to control flow past the annular valve seat; a molded dielectric cover element positioned on the valve body and serving to retain the diaphragm in place, and having a first recess therein cooperating with one face of the diaphragm to define a pressure chamber; said diaphragm having a bleed opening in a portion thereof communicating with the inlet chamber so that inlet fluid is enabled to flow from the inlet chamber through the bleed opening and into the pressure chamber to maintain the diaphragm closed against the annular valve seat; said molded cover element having a second recess in fluid communication with the first fluid recess; and said valve body having a bleed passage communicating with said second recess and interconnected with the outlet chamber so that fluid can be exhausted from the pressure chamber through the bleed passage to thus permit the inlet chamber fluid to open the diaphragm; a pilot valve element in the form of an armature disc floatably positioned in said second recess for controlling flow through the bleed passage; a solenoid formed as an insert in the molded cover element and comprising a U-shaped core having its ends located adjacent the face of the disc remote from the bleed passage, and an electric coil encapsulated within the cover element and surrounding part of the core; and spring means trained between the molded cover element and said remote disc face to rectilinearly urge the disc to a position closing the bleed passage when the solenoid is de-energized.

6. In combination, a molded one-piece valve body having at least one integrally formed tubular inlet conduit and at least one integrally formed tubular outlet conduit; said valve body having a discharge passage extending axially of the tubular outlet conduit; said valve body further having an annular inlet chamber formed in one of its faces communicating with said one inlet conduit, and and outlet chamber extending from said face into communication with the aforementioned discharge passage; a diaphragm positioned on said face and overlying the inlet and outlet chambers to control flow therebetween; a bleed passage extending from said valve body face into communication with the discharge passage; a molded dielectric cover element carried on said valve body face, said cover element having a first recess registering with the diaphragm and a second recess registering with the bleed passage; the first and second recesses having direct fluid communication with one another; said diaphragm having a bleed opening in a portion thereof registering with the inlet chamber so that inlet chamber fluid is enabled to flow into the first recess; a pilot valve element disposed in the second recess and constructed as an armature disc having a thickness less than the depth of the second recess so that the disc is enabled to move toward and away from the bleed passage for controlling flow therethrough; said molded cover element having an outwardly extending protruding section; a U-shaped core member of one-piece construction embedded in said protruding section with its ends extending into the second recess to reside closely adjacent one face of the armature disc; a spring positioned in the second recess for biasing the armature disc toward a position closing the bleed passage; and an electric coil encapsulated within the protruding section of the molded cover element and surrounding one leg of the core so that flow of electric current through the coil is effective to cause the armature disc to be drawn away from the bleed passage.

7. In combination, a molded one-piece mixing valve body having two integrally formed tubular inlet conduits and at least one integrally formed tubular outlet conduit all lying in the same plane; said valve body having a discharge passage extending axially of the tubular outlet conduit; said valve body further having annular inlet chambers formed in one of its faces and communicating directly with respective ones of the inlet conduits, and outlet chambers extending from said one face into communication with the aforementioned discharge passage; diaphragms positioned on said one face and overlying each respective inlet and outlet chamber to control flow therebetween; two bleed passages extending from said one valve body face into communication with the discharge conduit; a molded dielectric cover element carried on said one valve body face, said cover element having first recesses registering with the respective diaphragms and second recesses registering with the respective bleed passages; respective ones of the first and second recesses having direct fluid communication with one another; each diaphragm having a bleed opening in a portion thereof registering with the inlet chamber so that inlet chamber fluid is enabled to flow into the first two recesses; a pilot valve element disposed in each of the second recesses and constructed as an armature disc having a thickness less than the depth of the confining recess so that the armature disc is enabled to move toward and away from the bleed passage for controlling flow therethrough; said molded cover element having two outwardly extending protruding sections; a U-shaped core member of one-piece construction embedded in each of said protruding sections with its ends extending into one of the second recesses to reside closely adjacent one face of an armature disc; a spring positioned in each of the second recesses for biasing the armature disc toward a position closing the bleed passage; and an electric coil encapsulated within a protruding section of the molded cover element and surrounding one leg of each core so that flow of electric current through the coil is effective to cause its armature to be drawn away from the bleed passage.

8. The combination of claim 6 wherein the second recess and armature disc are of elongated rectangular cross section whereby to define a major axis and a minor axis, and the U-shaped core is arranged in a plane which contains the major axis.

9. In combination: a molded one-piece valve body having an integrally formed tubular inlet conduit, an integrally formed tubular outlet conduit, and a discharge passage extending within the body interior in communication with the outlet conduit; said valve body further having an annular inlet chamber formed in one of its faces in fluid communication with the inlet conduit, and an outlet chamber extending right angularly from said one face within the inlet chamber into communication with the discharge passage; an elastomeric diaphragm positioned on said one valve body face and overlying the inlet and outlet chambers to control flow therebetween; a molded one-piece dielectric cover carried on said valve body face with one face thereof engaging a peripheral portion of the diaphragm to retain same in operative position between the valve body and cover; said cover having a first recess in said one cover face registering with the central portion of the diaphragm to accommodate diaphragm movement away from the outlet chamber; said valve body having a bleed passage extending from said one body face to the aforementioned discharge passage, and said cover having a second recess in said one cover face registering with said bleed passage; said first and second cover recesses being in direct fluid communication with one another, and said first recess being in fluid communication with the aforementioned inlet chamber, whereby a pilot-flow path is established from the inlet chamber through the first cover recess, second cover recess, bleed passage, and discharge passage; a pilot valve element in the form of an armature floatably positioned in the second cover recess for controlling flow through the bleed passage; and a solenoid constructed as an insert encapsulated within the molded cover; said solenoid including a dielectric spool positioned within the cover in a location offset from the outlet chamber, and an electric winding trained on the spool; said elastomeric diaphragm having an extension lying against said one valve body face and spanning the second cover recess; said diaphragm extension having an opening therethrough interconnecting the second cover recess and bleed passage; and said armature being located in registry with said opening to move thereagainst to effect closing of the bleed passage; the peripheral portion of the diaphragm and the diaphragm extension lying in the same plane.

References Cited by the Examiner

UNITED STATES PATENTS

| 2,123,356 | 7/1938 | Glynn | 251—46 X |
| 2,553,769 | 5/1951 | Kempton | 137—606 |
| 2,638,927 | 5/1953 | Walker | 257—30 X |
| 2,738,157 | 3/1956 | Vargo | 251—30 |
| 2,848,188 | 8/1958 | Witzel | 251—141 |
| 2,951,503 | 9/1960 | Windsor | 137—606 |

FOREIGN PATENTS

| 211,070 | 10/1957 | Australia. |
| 6,451 | 1879 | Germany. |

ISADOR WEIL, Primary Examiner.

WILLIAM F. O'DEA, Examiner.

D. LAMBERT, Assistant Examiner.